(12) United States Patent
Stewenius

(10) Patent No.: US 8,934,662 B1
(45) Date of Patent: Jan. 13, 2015

(54) TRACKING IMAGE ORIGINS

(75) Inventor: Henrik C. Stewenius, Zürich (CH)

(73) Assignee: Google Inc., Mountain View, CA (US)

(*) Notice: Subject to any disclaimer, the term of this patent is extended or adjusted under 35 U.S.C. 154(b) by 191 days.

(21) Appl. No.: 13/417,631

(22) Filed: Mar. 12, 2012

(51) Int. Cl.
*G06K 9/62* (2006.01)

(52) U.S. Cl.
USPC .......................................................... 382/100

(58) Field of Classification Search
CPC ....................................................... G06F 17/24
See application file for complete search history.

(56) References Cited

U.S. PATENT DOCUMENTS

| | | | |
|---|---|---|---|
| 5,754,851 | A | 5/1998 | Wissner |
| 5,873,085 | A | 2/1999 | Enoki |
| 5,956,453 | A | 9/1999 | Yaegashi |
| 6,118,444 | A | 9/2000 | Garmon |
| 6,917,951 | B2 | 7/2005 | Orbits |
| 6,952,281 | B1 | 10/2005 | Irons |
| 7,191,405 | B1 | 3/2007 | Jaramillo |
| 7,216,292 | B1 | 5/2007 | Snapper |
| 7,356,679 | B1 | 4/2008 | Le |
| 7,426,717 | B1 | 9/2008 | Schang |
| 7,617,222 | B2 | 11/2009 | Coulthard |
| 2002/0052888 | A1 | 5/2002 | Sellen |
| 2002/0083037 | A1 | 6/2002 | Lewis |
| 2002/0133515 | A1* | 9/2002 | Kagle et al. .................... 707/511 |
| 2003/0018609 | A1 | 1/2003 | Phillips |
| 2003/0033319 | A1 | 2/2003 | Van Der et al. |
| 2003/0046261 | A1 | 3/2003 | Baker |
| 2003/0077066 | A1* | 4/2003 | Greenwood et al. ............ 386/52 |
| 2003/0145279 | A1* | 7/2003 | Bourbakis et al. ............ 715/511 |
| 2004/0065824 | A1 | 4/2004 | Bateman |
| 2004/0133608 | A1 | 7/2004 | Saake |
| 2005/0171947 | A1 | 8/2005 | Gautestad |
| 2005/0256909 | A1 | 11/2005 | Aboulhosn |
| 2005/0278395 | A1 | 12/2005 | Sandaire |
| 2006/0184522 | A1 | 8/2006 | McFarland |
| 2007/0255727 | A1 | 11/2007 | Hirose |
| 2008/0040388 | A1 | 2/2008 | Petri |
| 2008/0273090 | A1* | 11/2008 | Niimura ................... 348/207.99 |
| 2009/0164620 | A1 | 6/2009 | Ziegler |
| 2010/0067706 | A1* | 3/2010 | Anan et al. ..................... 380/285 |
| 2010/0182406 | A1* | 7/2010 | Benitez .......................... 348/46 |

OTHER PUBLICATIONS

'Windows Networking API/Redirector Structures' [online]. Microsoft Corporation Apr. 10, 2004, [retrieved on Oct. 17, 2006]. Retrieved from the Internet: URL: http://msdn.microsoft.com/library/en-us/wceredir/html/ceconwindowsnetworkingapiredirectorstructures.asp?frame=true.

(Continued)

*Primary Examiner* — Stephen R Koziol
*Assistant Examiner* — Delomia Gilliard
(74) *Attorney, Agent, or Firm* — Fish & Richardson P.C.

(57) ABSTRACT

Methods, systems, apparatus, and computer program products, including accessing first data that defines a first image, generate a first value by applying a mathematical function to the first data, generating a second image from the first data of the first image, the second image being a version of the first image and defined by second data that is different from the first data of the first image, associating the first value of the first image with the second image, generating a third image from the second data of the second image, the third image being a version of the second image and defined by third data that is different from the second data of the second image, and associating the first value of the first image with the third image.

17 Claims, 7 Drawing Sheets

(56) References Cited

OTHER PUBLICATIONS

'About Cache Manager in Windows Server 2003' [online]. Microsoft Corporation Apr. 29, 2004, [retrieved on Oct. 2, 2006]. Retrieved from the Internet: URL: http://support.microsoft.com/?kbid=837331.
'fuse' [online]. CSWL Inc. Nov. 30, 2005, [retrieved on Nov. 21, 2006]. Retrieved from the Internet: URL: http://wiki.tcl.tk/13853.
'Notes and Tags' [online]. Yahoo! Company May 11, 2005, [retrieved on Nov. 10, 2006]. Retrieved from the Internet: http://web.archive.org/web/20051105104022/http://www.flickr.com/learn_more_3.gne.
'Create: Enjoy your pictures in fun, creative ways—it's what photography's all about!' [online]. Google, Inc. 2005, [retrieved on Oct. 2, 2006]. Retrieved from the Internet: URL: http://picasa.google.com/features/features-create.html.
'Backup: Don't lose your digital memories. Safely back up your photos with Picasa' [online]. Google, Inc. 2005, [retrieved on Oct. 2, 2006]. Retrieved from the Internet: URL: http://picasa.google.com/features/features-backup.html.
'Prints & Products: Print beautiful pictures at home with more custom sizes or order prints, gifts and books from your favorite online companies' [online]. Google, Inc. 2005, [retrieved on Oct. 2, 2006]. Retrieved from the Internet: URL: http://picasa.google.com/features/features-print.html.
'Share: The hardest part of sharing your pictures is choosing your favorites' [online]. Google, Inc. 2005, [Retrieved on Oct. 2, 2006]. Retrieved from the Internet: URL: http://picasa.google.com/features/features-share.html.
'Edit: Turn a gray sky into a picture-perfect day' [online]. Google, Inc. 2005, [Retrieved on Oct. 2, 2006]. Retrieved from the Internet: URL: http://picasa.google.com/features/features-edit.html.
'Organize: Picasa instantly locates and organizes all the pictures on your computer' [online]. Google, Inc. 2005, [Retrieved on Oct. 2, 2006]. Retrieved from the Internet: URL: http://picasa.google.com/features/index.html.
'Translucent Databases' [online]. Infostrada Communications, LLC, Dec. 15, 2003; [retrieved on Nov. 21, 2006]. Retrieved from the Internet: URL: http://www.linux-mag.com/index.php?option=com_content&task+view&id=1514&Itemi . . . .
'doc.sun.com: man pages section 7: Device and Network Interfaces' [online]. Sun Microsystems, Inc., Apr. 10, 2001; [Retrieved on Nov. 21, 2006]. Retrieved from the Internet: URL: http://docs.sun.com/app/docs/doc/816-0222/6m6nmlt06?a=view.
'Using WebDAV with IIS' [online]. TechGenix Ltd., Feb. 3 2005; [retrieved on Nov. 21, 2006]. Retrieved from the Internet: URL: http://www.windowsnetworking.com/articles_tutorials/WebDAV-IIS.html.
'Microsoft Windows Vista Build 5231 (Community Technical Preview 2) Review' [online]. Penton Media, Inc. Oct. 18, 2005, [retrieved on Nov. 21, 2006]. Retrieved from the Internet: URL: http://www.winsupersite.com/reviews/winvista$_{13}$ 5231.asp.
'Windows 95/98/ME and large amounts of memory' [online]. Virtualdub.org May 18, 2005, [retrieved on Nov. 21, 2006]. Retrieved from the Internet: URL: http://www.virtualdub.org/blog/pivot/entry.php?id=37.
'Network and Communications' [online]. CSWL Inc. 1999, [retrieved on Nov. 21, 2006]. Retrieved from the Internet: URL: http://www.cswl.com/whitepapers/filter-driver.html.
Wenger et al., "Technology for communities," CEFRIO Book Chapter, v 5.2, Jan. 18, 2005, 15 pages.
Decker et al., "The Social Semantic Desktop," DERI Technical Report May 2, 2004, DERI—Digital Enterprise Research Institute, May 2004, 7 pages.

\* cited by examiner

TRACKING IMAGE ORIGINS

BACKGROUND

This specification relates to tracking the origin of images.

A search system can access resources available on a network and maintain an index or multiple indexes of the resources. For example, the resources could include HTML pages, word processing documents, and portable document format (PDF) documents, feed sources, and media such as images and video. The index of the resources can be queried to receive the resources or information about the resources.

With respect to images, many services take a particular image and produce slightly modified or at least recompressed versions of the particular image. Such modifications change the byte fingerprint of the image so that such fingerprints cannot be used to identify the images as the same image. For example, an image search engine crawls images and produces large and small thumbnails for serving with image search results. Likewise, an Internet photo management website often produces several different versions of an uploaded image and publishes these different versions. These are just a few examples of how many variations of a source image are produced and published.

SUMMARY

In general, in one aspect, a method includes accessing first data that defines a first image, generate a first value by applying a mathematical function to the first data, generating a second image from the first data of the first image, the second image being a version of the first image and defined by second data that is different from the first data of the first image, associating the first value of the first image with the second image, generating a third image from the second data of the second image, the third image being a version of the second image and defined by third data that is different from the second data of the second image, and associating the first value of the first image with the third image. Other implementations of this aspect include corresponding methods, apparatus, and computer program products.

Implementations of this aspect may include one or more of the following features. Associating the first value of the first image with the second image includes assigning the first value to a metadata field of the second image. The aspect includes applying a mathematical function to the second data to generate a second value, and associating the second value of the second image with the third image. The aspect includes assigning the first value to a database and assigning the first image to the database in association with the first value. The aspect includes assigning the first value to a database and assigning an identification of the first image to the database in association with the first value. The aspect includes generating a cryptographic signature of the first value and associating the cryptographic signature with the first image. Associating the first value of the first image with the second image includes encrypting the first value and associating the encrypted first value of the first image with the second image. The mathematical function is a hash function. Generating a second image from the first data of the first image includes applying a transformation to the first data of the first image. The aspect includes assigning, to a metadata field of the second image, information about the transformation.

In another aspect, a method includes accessing first data that defines a first image, identifying a first value associated with the first image, the first value having been generated by applying a mathematical function to second data defining a second image, the second image being a predecessor version of the first image, generating a third image from the first data of the first image, the third image being a version of the first image and defined by third data that is different from the first data of the first image, and associating the first value of the first image with the third image.

Implementations of this aspect may include one or more of the following features. Associating the first value of the first image with the third image includes assigning the first value to a metadata field of the third image. The first value associated with the first image is identified in a database of values associated with image data.

Particular implementations of the subject matter described in this specification can be implemented so as to realize one or more of the following advantages. A search system spends considerable resources indexing and processing images. However many of the images that are available are derivatives of particular images. Because the search system cannot use a byte fingerprint or hash value to identify the images as being the same, the search system may use complex image processing techniques to determine that a set of images all relate to the same particular image. Thus, considerable resources may be allocated to indexing and processing derivative images.

Using the techniques described here, information describing one image need not be duplicated for another image, thereby reducing processing resources required to process and index images. For example, the invocation of resource intensive image processing techniques that are used to identify similar images can be reduced or eliminated when an image value indicates multiple images are each derivatives of a first image. Thus, a search system can avoid serving two similar images twice in the same set of search results. Also, information describing an image, such as some types of metadata, can be shared between an image and its derivatives. The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

An online media index may store information about online media items such as images available on the Internet. Some of the information may include results of an analysis performed for the media index, such as an identification of objects or places or buildings or other subjects represented in the image. Different versions of the same image may be indexed as different images, even though the different versions represent the same subjects and would otherwise share much of the same information. If one image is used to create another version of the same image, such as a cropped, resized, or enhanced version of the same image, the new version of the image, which can be called a "derivative image", can be given a metadata tag that identifies the predecessor version of the image. When the new version of the image is indexed by the media index, the media index can use the metadata tag to identify the predecessor version in the index and avoid generating duplicate information about the images.

The subject matter of this specification is described in the context of indexing and processing of images for a search engine. However, the metadata tagging of derivative images can be used in a variety of different applications in which the identification of predecessor images and derivative images can be used to facilitate one or more processing operations.

Figure 1:
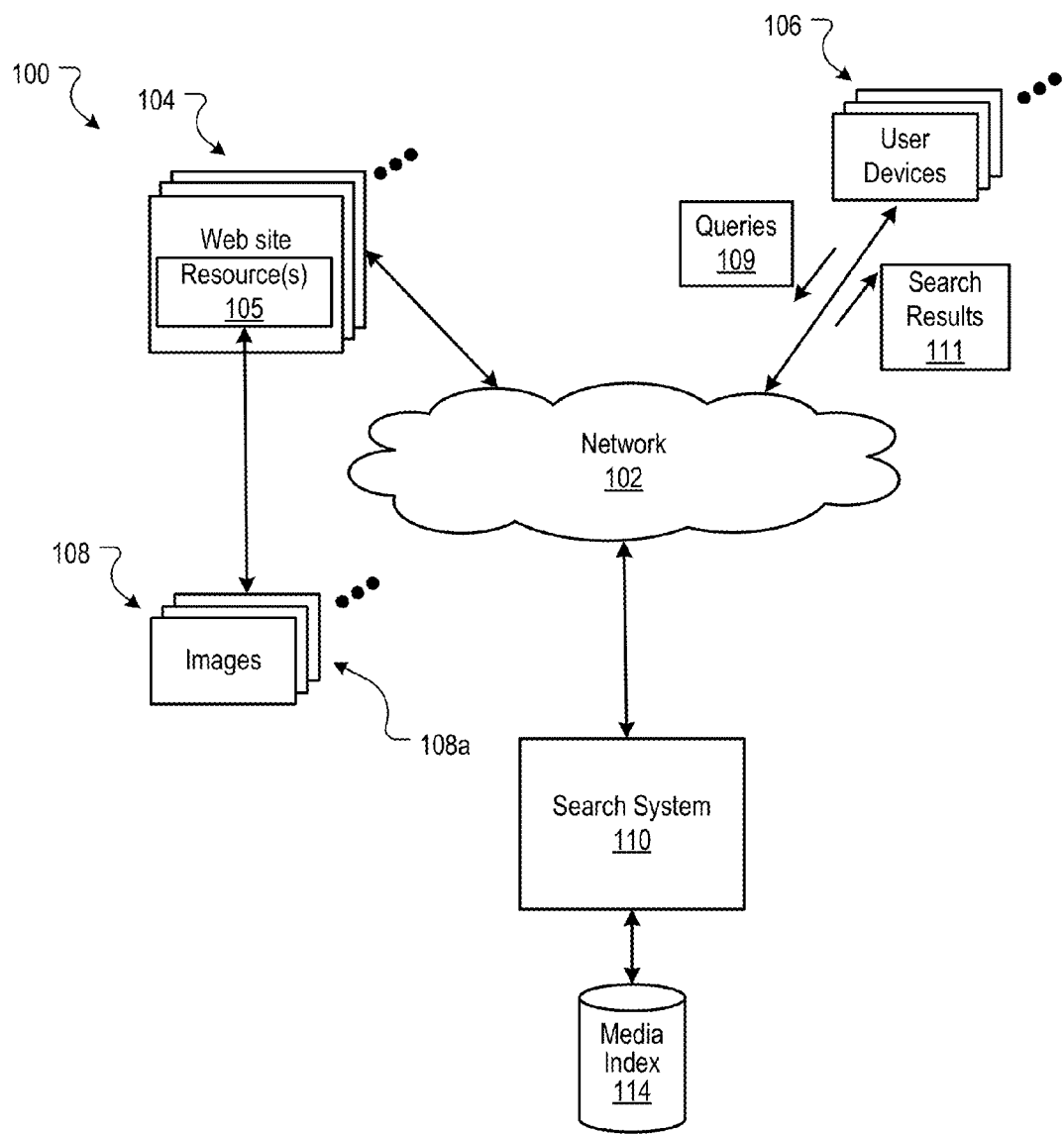
FIG. 1 is a block diagram of an example environment in which images are processed.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many web sites 104 and user devices 106, which are also sometimes referred to as client devices.

A web site 104 is a facility containing one or more resources 105 associated with a domain name and hosted by one or more servers. An example web site 104 is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by the web site 104 over the network 102 and that is associated with a resource 105 address. Resources 105 include HTML pages, word processing documents, and portable document format (PDF) documents, feed sources, and media such as images and video, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided by the web sites 104. Data about the resources 105 can be indexed based on the resource 105 to which the data corresponds. For example, if images 108 are among the resources 105, the search system 110 can store data about the images 108 in a media index 114. In some examples, some of the data may be results of an analysis performed by search system 110 or performed on behalf of the search system 110. For example, the media index 114 could include information such as an identification of objects or places or buildings or other subjects represented in the images 108.

The user devices 106 submit search queries 109 to the search system 110. In response, the search system 110 identifies resources 105 that are responsive to, e.g., have at least a threshold relevance score for the search query 109. The search system 110 generates search results 111 that identify the resources 105 and returns the search results 111 to the user devices 106. An example search result 111 can include a web page title, a snippet of text or an image or a portion of an image extracted from the web page, and the URL of the web page.

The user devices 106 receive the search results 111, e.g., in the form of one or more web pages, and render the pages for presentation to users. In response to the user selecting a link in a search result 111 at a user device 106, e.g., selecting an image with an embedded link in an image search result, the user device 106 requests the resource 105 identified by the link. The web site 104 hosting the resource 105 receives the request for the resource 105 from the user device 106 and provides the resource 105 to the requesting user device 106.

The search system 110 crawls web sites 104 that together contain multiple versions of the same image 108. For example, the search system 110 may discover and index one version of an image 108. An analysis may then be performed on the image, for example, to identify objects or places or buildings or other subjects represented in the image 108. At the same time or at a later time, the search system 110 may discover another version 108a of the same image, also referred to as a "derivative image." For example, the derivative image 108a of the original image 108 may be a resized version of the original image 108, or a version of the original image with text added, or a version of the original image 108 with some other kind of modification.

If the search system 110 has already added information about the original image 108 to the media index 114, then information about the derivative image 108a may be partially redundant and need not be added to the media index 114. The derivative version 108a may depict the same objects or places or buildings or other subjects depicted in the original image 108. In some examples, if the media index 114 has performed an analysis of the original image 108 then the information determined by the analysis may also apply to the other version 108a of the image. For example, if the derivative image 108a is a resized version of the original image 108, then the derivative image 108a depicts the same subjects depicted in the original image 108. Rather than perform another analysis of the derivative image 108a, the media index 114 can associate the information determined by the analysis of the original image 108 to the derivative image 108a. This association is facilitated by the use of metadata tags added to the derivative image 108a to identify the original image 108.

Figure 2:
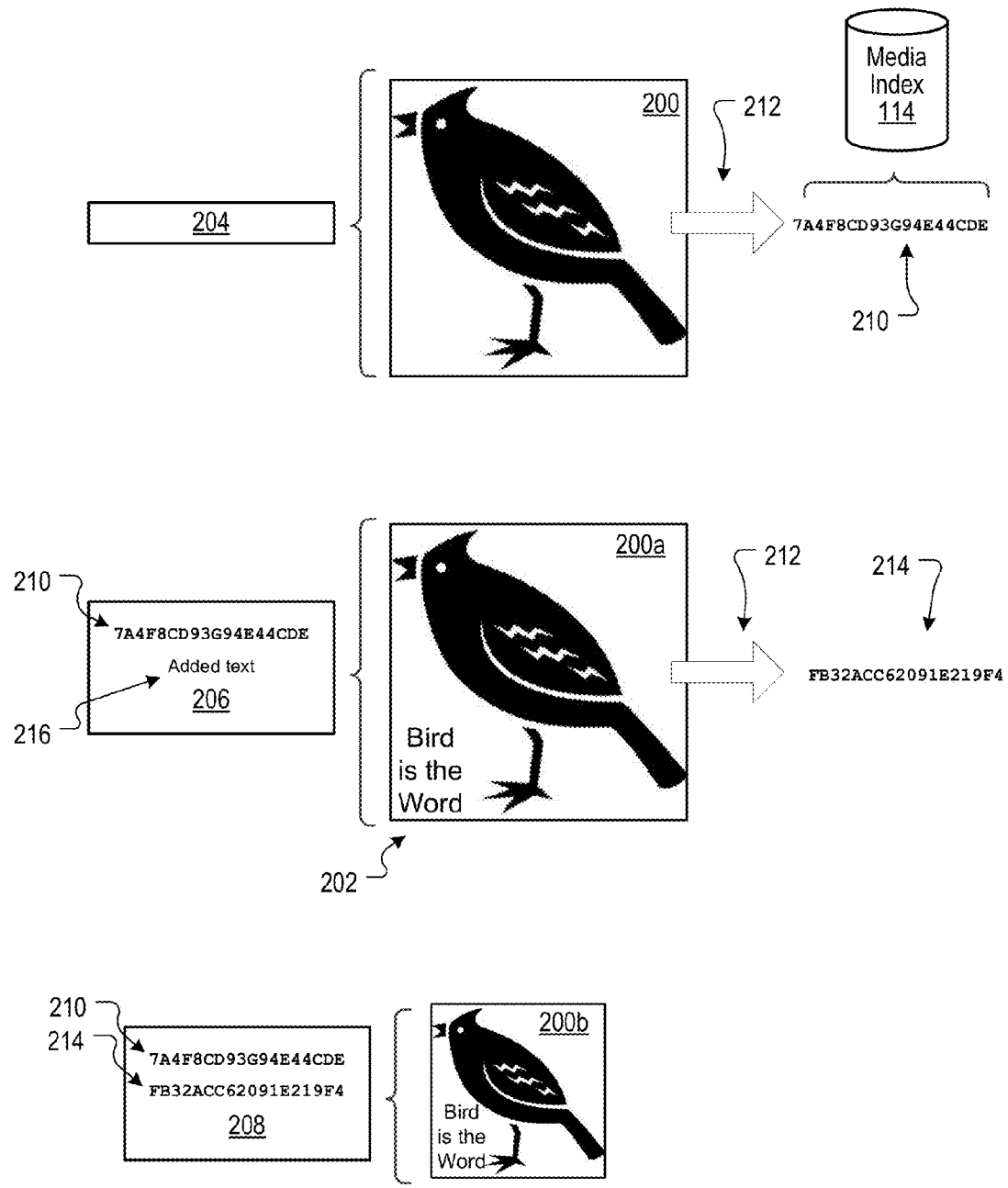
FIG. 2 shows three versions of an image.

FIG. 2 shows three versions of an image. The first image 200 represents an image that was used to generate the second image 200a. In the example shown in the figure, the second image 200a is a version of the first image 200 with text 202 added. For example, the text 202 may have been added using image editing software. The second image 200a was used to generate the third image 200b. In the example shown in the figure, the third image 200b is a resized version of the second image 200b. For example, the second image 200b may have been resized using image editing software. Thus, images 200a and 200b are both derivative images of the image 200. Although the image 200b was created from the image 200a, it is still considered a derivative version of the image 200. Additionally, the image 200b may also be considered to be a derivative image of the image 200a.

Similarly, an image that is used as the basis for another version of the image is also referred to as a "predecessor version" or "predecessor image." Generally, a predecessor version of an image will depict the same subjects and otherwise have many attributes in common with the image generated from the predecessor version of the image. Accordingly, the image 200 is an immediate predecessor to the image 200a, and is a predecessor to the image 200b. Likewise, the image 200a is an immediate predecessor to the image 200b. Stated another way, the second image 200a is a predecessor version of the third image 200b, and the first image 200 is a predecessor version of both the second image 200a and the third image 200b.

Each image 200, 200a, 200b is associated with information describing the respective image. In some examples, each image 200, 200a, 200b is associated with metadata 204, 206, 208. Metadata is data associated with the image that describes the image. For example, if the image is represented in a computer system in the form of a data file, then metadata can be associated with the image by including the metadata in the data file. Metadata can be added to a data file representing an image at the time the image is created or after an image is created. In some implementations, a standardized file format that supports metadata can be used. For example, the exchangeable image file format (Exif) supports the inclusion of metadata within Exif-formatted data files.

In some implementations, the metadata of one of the images can contain a value generated from another image. For example, the metadata 206 of the second image 200a can contain a data value 210 generated from the first image 200. In some implementations, the data value 210 is generated by applying a mathematical function 212 to the first image 200, and the data value 210 is stored in the metadata 204 of the image 200. In some examples, the mathematical function 212 can be a hash function. A hash function is a mathematical function which accepts data of arbitrary length as input and generates a data string of fixed length as output. For example, the hash function could be a hash function such as MD5, SHA-1, or another hash function. Given the same data as input, a hash function will return the same data string as output. In some implementations, the data value 210 can be placed in the metadata 206 of the second image 200a when the second image 200a is created. For example, if the second image 200a is created using image editing software, the image editing software determines the data value 210, either by accessing the metadata 204 of the image 200 or by hashing the image 200, and stores the value 210 in the metadata 206.

The data value 210 contained in the metadata 206 of the second image 200a can be used to identify the image 200 that was used to generate the second image 200a. In some examples, the search system 110 determines the data value 210, either by accessing the metadata 204 of the image 200 or by hashing the image 200, and stores the value in the media index 114 when analyzing and indexing the image 200. When a new image is received, e.g., the image 200a, the search system 110 checks the metadata 206 of the second image 200a for a stored value generated from another image. If the first image 200 is already indexed in the media index 114 so that the data value 210 is accessible, then the search system 110 determines that the second image 200a is a derivative version of the first image 200. For example, the search system 110 can use the data value 210 as a query into the media index 114 to receive the first image 200 or information identifying the first image 200 in response. The search system 110 can then identify the first image 200 as a predecessor version of the second image 200a.

The media index 114 can associate information describing a predecessor image, e.g., the first image 200, with the image generated from the predecessor image, e.g., the second image 200a. In some examples, metadata 208 of the third image 200b can contain a data value 210 generated from the first image 200. For example, when the third image 200b is created from the second image 200a, the data value 210 can be carried over from the metadata 206 of the second image 200a to the metadata 208 of the third image 200b. Thus, even though the first image 200 is not the immediate predecessor of the third image 200b, the third image 200b is still associated with the data value 210 that can be used to identify or locate the first image 200. For example, information describing the first image 200 stored in the media index 114 can be associated with the third image 200b when the third image 200b is indexed in the media index 114.

In some implementations, a data value 214 generated from the second image 200a, for example, a data value 214 generated using the mathematical function 212, can also be included in the metadata 208 of the third image 200b. Accordingly, when the third image 200b is created from the second image 200a, the data values 210 and 214 are stored in the metadata 208 for the third image 200b. Thus, the lineage of the third image 200b can be determined, i.e., the data values 210 and 214 indicate the third image 200b was created from the second image 200a, and that the second image 200a was created from the first image 200.

In some implementations, the first image 200 need not store a data value in its metadata 204. For example, when the media index 114 receives the first image 200, the media index 114 can determine that the first image 200 does not store a data value in its metadata 204 and use this determination as a signal that the first image 200 may not have any predecessor images.

In some implementations, the metadata of images can contain other information about images. The other information can include information about transformations applied to the images. For example, the metadata 206 of the second image 200a can contain a metadata field 216 indicating that the second image 200a has text added. Although FIG. 2 depicts the metadata field 216 as descriptive plain language text, the metadata field 216 could take other forms. For example, the metadata field 216 could be a pattern of bits in which each bit indicates whether a particular kind of transformation has been used.

Figure 3:
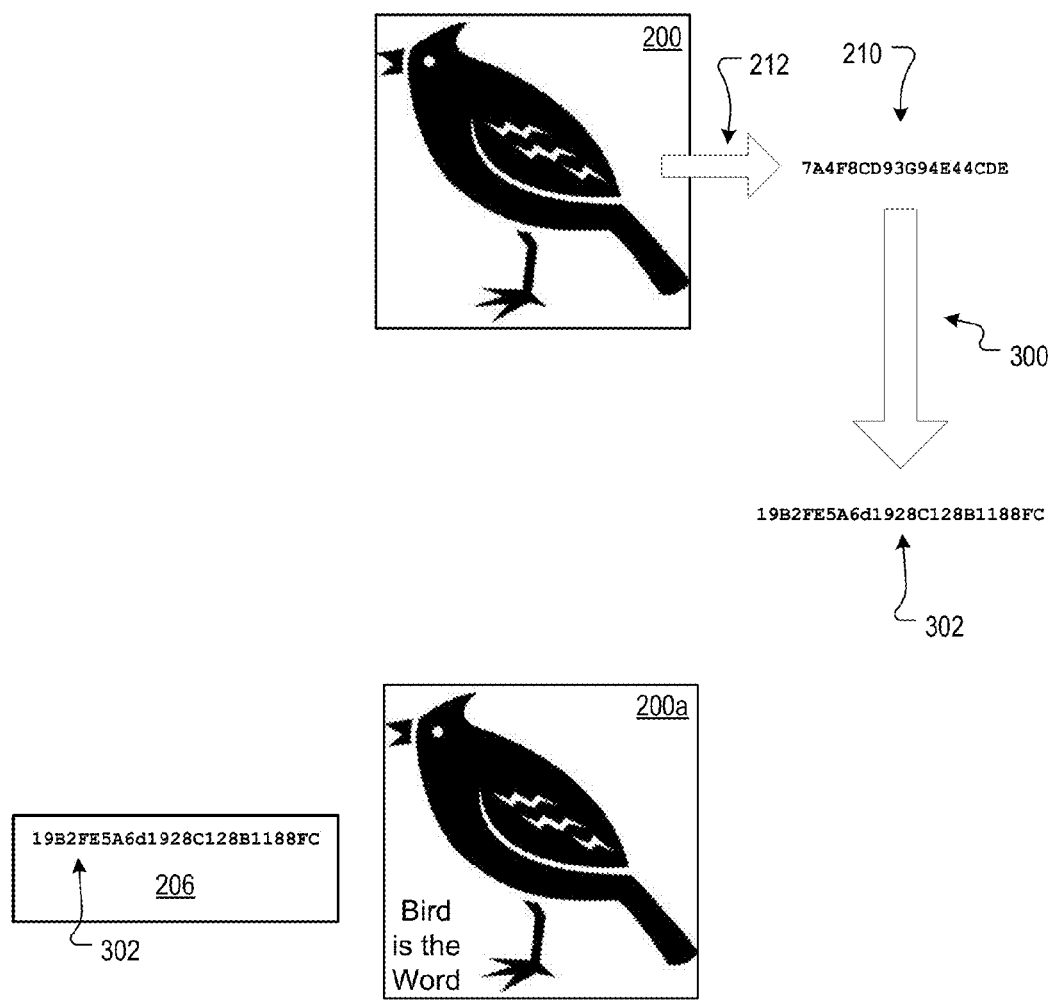
FIG. 3 shows an example of a cryptographic signature.

FIG. 3 shows an example of a cryptographic signature used with images. In some implementations, after the data value 210 is generated from the first image 200, the data value 210 can be encrypted. For example, a cryptographic function 300 can be applied to the data value 210 to generate a cryptographic signature 302. The cryptographic signature 302 can then be placed in the metadata 206 of the second image.

The cryptographic signature 302 is an encrypted version of the data value 210. In some examples, the cryptographic function 300 could be a public key cryptographic function which uses a private key as input when encrypting the cryptographic signature 302 and uses a public key as input when decrypting the cryptographic signature 302. Generally, the public key can be accessed—for example, in a database of public keys—by any entity who wishes to decrypt the cryptographic signature 302 to access the encrypted data value 210 and verify that the image 200 was the actual image used to generate the second image 200a. The cryptographic signature 302 can only be placed by an entity that has possession of the private key, for example, the entity that created the second image 200a. In some examples, the public key can be used to encrypt the cryptographic signature 302 and the private key can be used to decrypt the cryptographic signature 302.

Figure 4:
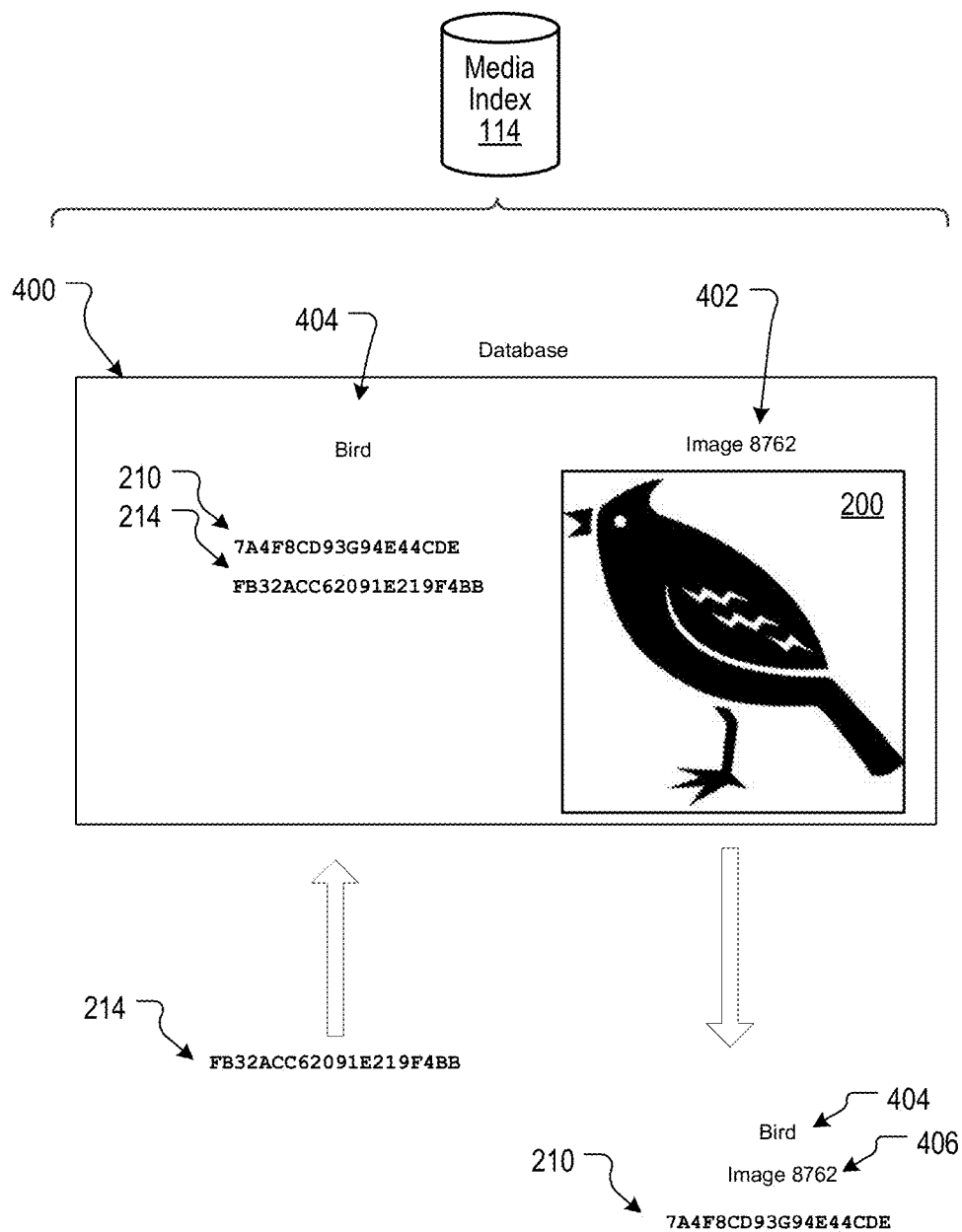
FIG. 4 shows an example of a database entry representing an image.

FIG. 4 shows an example of a database entry 400. For example, the database entry 400 could be stored in the media index 114. A database entry 400 can represent an image 200, e.g., contain the image 200 and contain information about the image 200, or can alternatively reference a location at which the image 200 is stored and contain information about the image 200. The database entry 400 allows information associated with an image 200, for example, information describing the image 200 and associations with other images generated from that image.

In some implementations, the database entry 400 includes an identification value 402 for the image 200. In some examples, the identification value 402 could be a unique value assigned to this particular image 200. For example, the identification value 402 could be a number or database key associated with the image 200.

In some implementations, the database entry 400 includes a description 404 of the image 200. For example, the description 404 could be a result of an analysis performed for and stored in the media index 114 upon the image 200. In some examples, the description 404 could be an identification of objects or places or buildings or other subjects depicted in the image 200. For example, if the image 200 is a picture of a bird, the description 404 could include the word "bird." Other descriptive information can include feature vector values, an image file type, and other kinds of information.

In some implementations, the database entry 400 includes one or more data values 210, 214 generated from images. For example, the database entry 400 can include a data value 210 generated from the image 200 represented by this database entry 400. In some examples, the database entry 400 can include a data value 214 generated from images other than the image 200 represented by this database entry 400. For example, the database entry 400 can include a data value 214 generated from a derivative image that is a modified version of the image 200 represented by this database entry 400. An example of an image that is a modified version of the image 200 is the second image 200*a* shown in FIG. 2. For example, the media index 114 received the modified version of the image 200 and the derivative image was associated with the original image 200 in the database entry 400 by including, in the database entry 400, the data value 214 generated from the modified image. Likewise, a database entry for the derivative image may include the metadata 210 of the original image. By doing so, the selection of any of an original image or one of its derivative images provides access to a corresponding database entry in which data values 214 for all related images are stored.

In some implementations, an entity can query the media index 114 to receive information stored in the database entry 400. For example, the search system 110 can provide a data value 214 to the search system 110 as a query and return information from the database entry 400 based on the presence of the data value 214 within the database entry 400. For example, the search system 110, by means of the query and accessing the media index 114, may identify the second image 200*a* as being responsive to the data value 214, and may also identify that the second image 200*a* is a derivative image of the first image 200, and that the second image 200*a* is a predecessor image to the third image 200*b*. The identification can be done in the absence of more complex image analysis processes, such as visual similarity detection processes.

Figure 5:
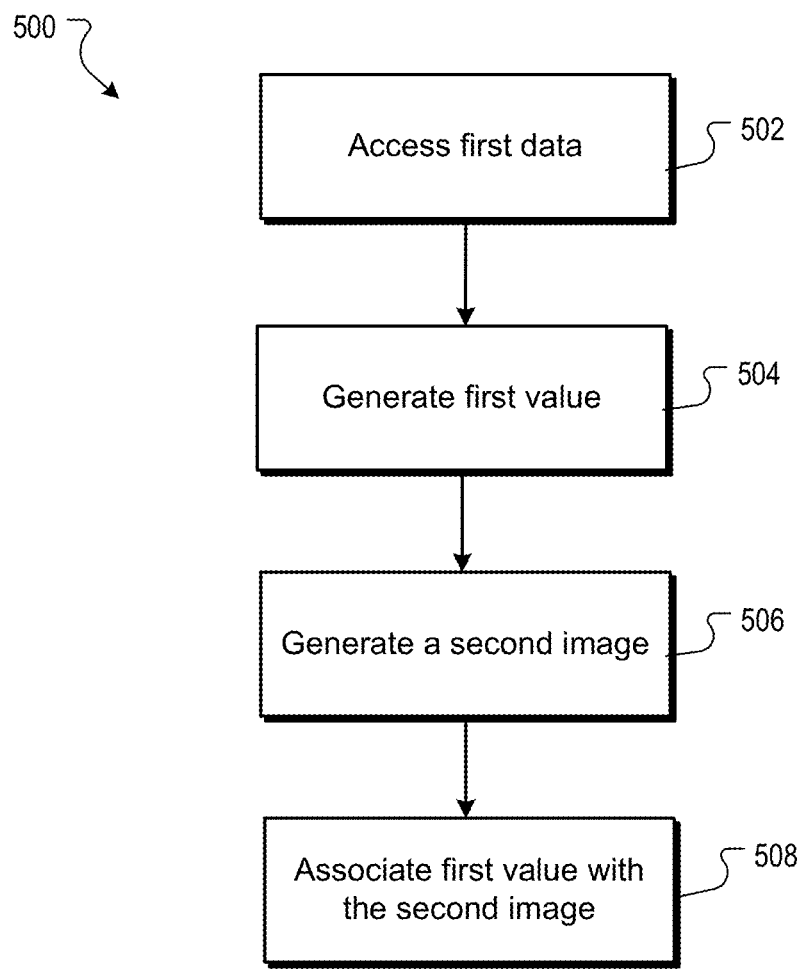
FIG. 5 is a flowchart of an example process for associating values with images.

FIG. 5 is a flowchart of an example process 500 for associating values with images. The operations of the process 500 can be performed, for example, by an apparatus operating image processing software.

At operation 502, first data that defines a first image is accessed. For example, the first data can be a data file representing the image. In some examples, the image is accessed by image editing software. Image editing software can be a user-controlled application, for example, an application with a user interface. Image editing software can be an automated application, for example, an application that automatically modifies and generates images. For example, the automated application may execute in association with a search system 110 as shown in FIG. 1.

At operation 504, a first value is generated. The first value can be generated by applying a mathematical function to the first data of the first image. In some examples, the mathematical function is a hash function that is applied to the first data of the first image to output a data string that is the first value.

At operation 506, a second image is generated from the first data of the first image. The second image can be a version of the first image and defined by second data that is different from the first data of the first image. For example, the second image can be a resized version of the first image, or the second image can be a version of the first image with additional graphical elements added such as text or a colored border, or the second image can be another modified version of the first image.

At operation 508, the first value of the first image is associated with the second image. In some examples, the first value can be placed in metadata associated with the second image. For example, the second data of the second image can include metadata in the form of metadata fields, also referred to as metadata tags, and the first value can be placed in a metadata field or metadata tag.

Figure 6:
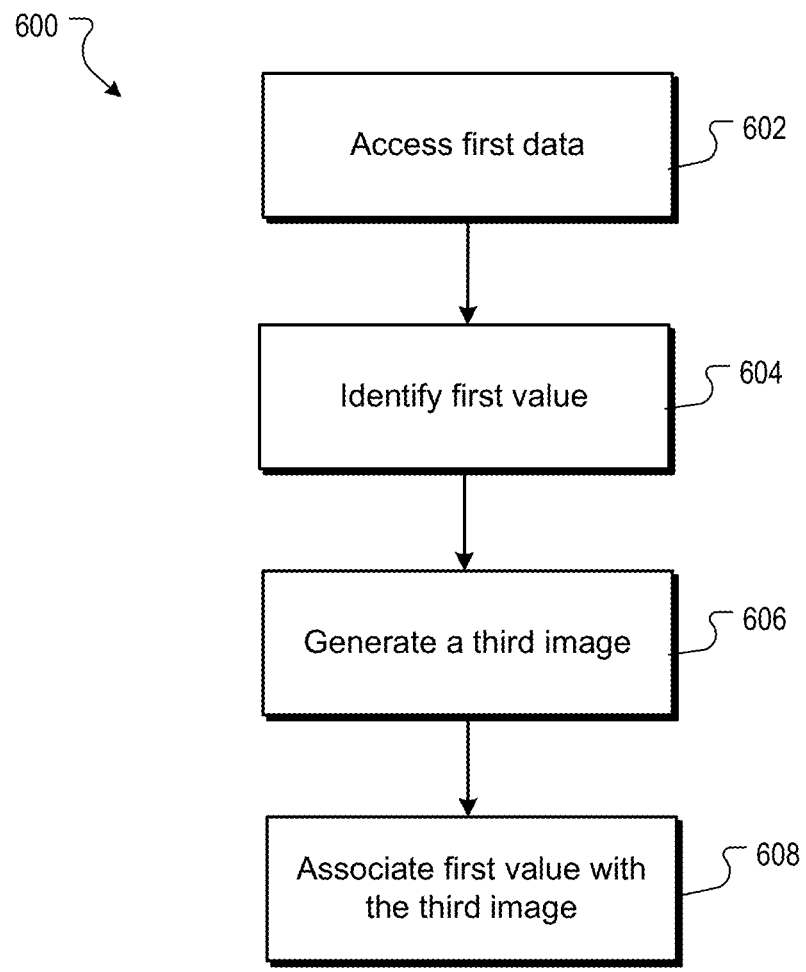
FIG. 6 is a flowchart of another example process for associating values with images.

FIG. 6 is a flowchart of another example process 600 for associating values with images. The operations of the process 600 can be performed, for example, by an apparatus operating image processing software.

At operation 602, first data that defines a first image is accessed. For example, the first data can be a data file representing the image. In some examples, the image is accessed by image editing software.

At operation 604, a first value associated with the first image is identified. The first value may have been generated from a second image that is a predecessor version of the first image. For example, the first value may have been generated by applying a mathematical function, such as a hash function, to data of the second image.

At operation 606, a third image is generated from the first data of the first image. The third image can be a version of the first image and defined by third data that is different from the first data of the first image. For example, the third image can be a resized version of the first image, or the third image can be a version of the first image with additional graphical elements added such as text or a colored border, or the third image can be another modified version of the first image.

At operation 608, the first value of the first image is associated with the third image. In some examples, the first value can be placed in metadata associated with the third image. For example, the third data of the third image can include metadata in the form of metadata fields, also referred to as metadata tags, and the first value can be placed in a metadata field or metadata tag.

In variations of this process, a second data value can also be generated by applying the hash function to the third image. The second data value is then associated with the third image. Accordingly, the second data value indicates the third image is a derivative of the first image, and the first data value indicates the third image is also a derivative of the second image.

Figure 7:
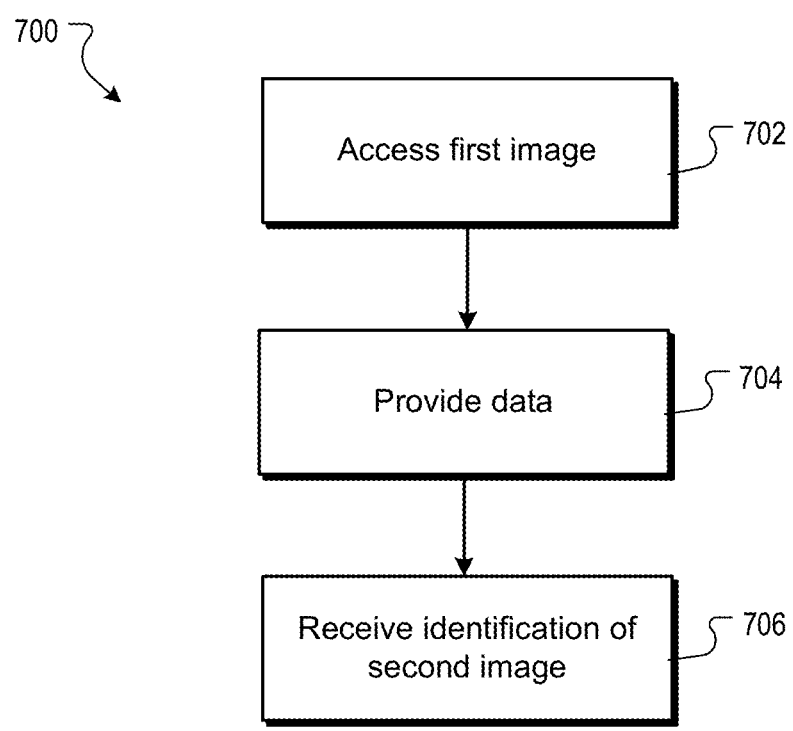
FIG. 7 is a flowchart of an example process for accessing information in a database.

FIG. 7 is a flowchart of an example process 700 for accessing information in a database. The operations of the process 700 can be performed, for example, by a search system 110 accessing the media index 114.

At operation 702, a first image is accessed. The first image has a metadata field. For example, the metadata field could contain a value generated from data of the first image. The value could be the output of a hash function.

At operation 704, data of the metadata field can be provided as a query to a database of values associated with image data. For example, the database can contain information describing an image represented by the image data. In some examples, the information includes an identification of objects or places or buildings or other subjects represented in the image. In some examples, the information can be associated with multiple versions of the image in the database.

At operation 706, an identification of a second image is received from the database. The second image is a predecessor version of the first image. In some examples, the first image may have been generated from the second image by editing the second image in an image editing application. In some examples, the first image may have been generated from another image, and the other image may have been generated from the second image. In some examples, the identification of the second image could be a serial number of the second image. In some examples, the identification of the second image could be a data value generated from the second image. In some examples, information describing contents of the second image can also be received from the database in response to the query.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   generating a first value that identifies a first image, the first value being generated based on a mathematical function that is applied to first data representing visual characteristics of the first image;
   identifying, by one or more computers, a second image that is a derivative image of the first image, the derivative image of the first image being an image that was created using the first image, and is different from the first image;
   storing, by one or more computers, the first value in association with the second image to identify the second image as a derivative image of the first image; and
   determining, by one or more computers, that a set of information characterizing the second image includes redundant information that matches information that has been stored in association with the first image;
   removing, from the set of information characterizing the second image, at least a portion of the redundant information to provide index data representing differences between the second image and the first image;
   receiving a query from a device;
   determining that the second image is responsive to the query; and
   outputting, to the device in response to the query and as a representation of the set of information characterizing the second image, at least a portion of the index data of the second image and the first value of the first image.

2. The method of claim 1, wherein storing the first value in association with the second image includes assigning the first value to a metadata field of the second image.

3. The method of claim 1, further comprising
   applying a mathematical function to second data of the second image to generate a second value; and
   associating the second value of the second image with a third image that is a derivative image of the second image.

4. The method of claim 1, further comprising assigning the first value to a database and assigning the first image to the database in association with the first value.

5. The method of claim 1, further comprising assigning the first value to a database and assigning an identification of the first image to the database in association with the first value.

6. The method of claim 1, further comprising generating a cryptographic signature of the first value and associating the cryptographic signature with the first image.

7. The method of claim 1, wherein storing the first value in association with the second image includes encrypting the first value and associating the encrypted first value with the second image.

8. The method of claim 3, wherein the mathematical function is a hash function.

9. The method of claim 1, further comprising generating a second image from first data of the first image, wherein the generating includes applying a transformation to the first data of the first image.

10. The method of claim 9, further comprising assigning, to a metadata field of the second image, information about the transformation.

11. A system comprising:
    one or more data processing apparatus; and
    a memory coupled to the data processing apparatus having instructions stored thereon which, when executed by the one or more data processing apparatus cause the one or more data processing apparatus to perform operations comprising:

generating a first value that identifies a first image, the first value being generated based on a mathematical function that is applied to first data representing visual characteristics of the first image;

identifying a second image that is a derivative image of the first image, the derivative image of the first image being an image that was created using the first image, and is different from the first image;

storing the first value in association with the second image to identify the second image as a derivative image of the first image; and determining that a set of information characterizing the second image includes redundant information that matches information that has been stored in association with the first image;

removing, from the set of information characterizing the second image, at least a portion of the redundant information to provide index data representing differences between the second image and the first image;

receiving a query from a device;

determining that the second image is responsive to the query; and outputting, to the device in response to the query and as a representation of the set of information characterizing the second image, at least a portion of the index data of the second image and the first value of the first image.

12. The system of claim 11, storing the first value in association the second image includes assigning the first value to a metadata field of the second image.

13. The system of claim 11, the operations further comprising
applying a mathematical function to second data of the second image to generate a second value; and
associating the second value of the second image a third image that is a derivative image of the second image.

14. The system of claim 11, the operations further comprising assigning the first value to a database and assigning the first image to the database in association with the first value.

15. The system of claim 11, the operations further comprising assigning the first value to a database and assigning an identification of the first image to the database in association with the first value.

16. The system of claim 11, the operations further comprising generating a cryptographic signature of the first value and associating the cryptographic signature with the first image.

17. The system of claim 11, wherein storing the first value in association with the second image includes encrypting the first value and associating the encrypted first value with the second image.

* * * * *